Dec. 18, 1956 C. L. SEMMELMAN 2,774,890

NONRECIPROCAL TRANSMITTING DEVICES

Filed Aug. 30, 1952 3 Sheets-Sheet 1

INVENTOR
C. L. SEMMELMAN

BY N. S. Ewing
ATTORNEY

Dec. 18, 1956 C. L. SEMMELMAN 2,774,890

NONRECIPROCAL TRANSMITTING DEVICES

Filed Aug. 30, 1952 3 Sheets-Sheet 2

INVENTOR
C. L. SEMMELMAN
BY N. S. Ewing
ATTORNEY

Dec. 18, 1956 C. L. SEMMELMAN 2,774,890

NONRECIPROCAL TRANSMITTING DEVICES

Filed Aug. 30, 1952 3 Sheets-Sheet 3

INVENTOR
C. L. SEMMELMAN
BY
N. S. Ewing
ATTORNEY

United States Patent Office 2,774,890

Patented Dec. 18, 1956

2,774,890

NONRECIPROCAL TRANSMITTING DEVICES

Charles L. Semmelman, Chatham, N. J., assignor to Bell Telephone Laboratories, Incorporated, New York, N. Y., a corporation of New York Application August 30, 1952, Serial No. 307,263

18 Claims. (Cl. 307—149)

This invention relates to nonreciprocal transmission systems and more particularly to unilaterally conducting transmission devices made from Hall effect plates.

It is proposed in the application of W. P. Mason and W. Shockley, Serial No. 302,278, filed August 1, 1952, entitled "Negative Resistance Amplifier," to use a Hall effect plate and an associated impedance network to obtain unilateral transmission for alternating currents. In the Hall plates of this copending application, however, as in the usual Hall effect plates, the output terminals are placed symmetrically, i. e., at equipotential locations with respect to the input terminals, so that, in the absence of the magnetic field, there is no transmission of alternating current between input and output terminals.

The object of the instant invention is to provide a single simple passive element requiring no external circuit elements, which likewise will transmit electrical current better in one direction than in the other.

In accordance with the invention, the input terminals of a Hall effect plate are located, not in the usual symmetric conductive position relative to the output terminals but in different positions such that the resultant unit will transmit current in one direction better than in the other. In accordance with particular embodiments to be described hereinafter, by the proper shaping of the body and the placement of the electrodes, the transfer impedance resulting from direct conduction may be made substantially equal to the Hall effect transfer impedance, and the units may be made to be inherently unilateral conductors of electric signals.

In accordance with one feature of the invention, switching from one Hall effect terminal pair to another is effected by varying or reversing the value of magnetic field applied to the Hall plate.

Another feature of the invention resides in the reversal of direction of unilateral transmission upon the reversal of the polarity of the magnetic field applied to the Hall effect plate.

Further objects and various features of the invention will be developed in connection with the detailed description of particular embodiments of the principles of the invention which are illustrated in the drawings.

Figure 1:
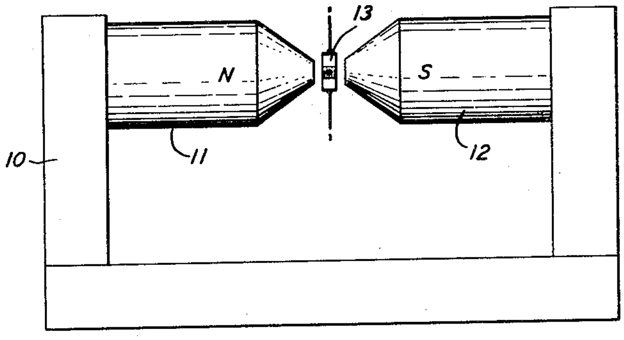
Fig. 1 represents a magnetic yoke having a Hall effect plate between its poles.

In Fig. 1, the permanently magnetized yoke 10 and pole pieces 11 and 12 serve to induce a magnetic field in the Hall effect element 13. This Hall effect element may be made of any of the usual Hall effect materials, such as bismuth or germanium.

Figure 2:
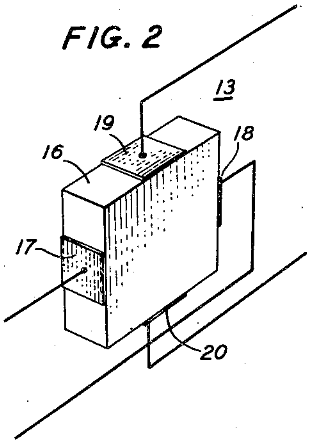
Fig. 2 is an isometric view of a conventional four-terminal Hall effect plate.

Fig. 2 is a detailed view of a conventional Hall effect plate 16 having a first pair of terminals 17 and 18 and a second pair of terminals 19 and 20.

It is known that the expression for the current and voltage in a linear four terminal network of this type is as follows:

$$E_1=R_{11}I_1+R_{12}I_2 \quad (1)$$
$$E_2=R_{21}I_1+R_{22}I_2 \quad (2)$$

where $E_1$ and $E_2$ are the input and output voltages, $I_1$ and $I_2$ are the input and output currents, $R_{11}$ and $R_{22}$ are the input and output self-impedances and $R_{12}$ and $R_{21}$ are the forward and reverse transfer impedances.

As set forth in the above-noted Mason-Shockley application, the polarizing magnetic field produces an asymmetric current flow in the Hall effect plate. The result seen at the terminals of a Hall effect unit is a 180-degree phase shift for one direction of transmission of alternating current, and no phase shift for the opposite direction. For direct current there is a reversal of current direction, for one direction of transmission. Thus the Hall transfer impedance $$R_H=R_{12}=-R_{21} \quad (3)$$

In addition, with the symmetrical form of Fig. 2, the self-impedance $$R_S=R_{11}=R_{22} \quad (4)$$

Making the foregoing substitutions, the initial Formulae 1 and 2 become $$E_1=R_SI_1+R_HI_2 \quad (5)$$
$$E_2=-R_HI_1+R_SI_2 \quad (6)$$

It is further noted that, lacking the magnetic field, the transfer impedances in both directions would be zero, because of the symmetrical relationship of the input and output terminals which places them at equipotential locations with respect to each other.

Figure 3:
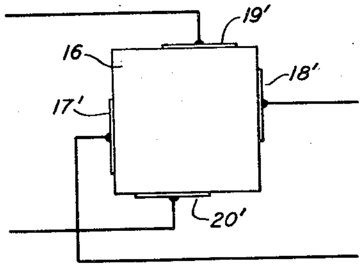
Fig. 3 shows a square Hall effect plate with terminals shifted in location toward diagonally opposite corners.

Fig. 3 shows a Hall effect plate similar to that of Fig. 2, but with the terminals 17' and 20' shifted toward one corner, and terminals 18' and 19' shifted toward the diagonally opposite corner. This change has the effect of introducing an additional transfer impedance term ($R_D$) into Formulae 5 and 6. The physical reason for this lies in the fact that terminals 19' and 20' no longer lie at equipotential points in respect to the other terminal pair 17' and 18' when no magnetic field is applied.

Introducing this additional transfer impedance term $R_D$ due to direct conduction between the adjacent terminals, Expressions 5 and 6 become:

$$E_1=R_SI_1+(R_D+R_H)I_2 \quad (7)$$
$$E_2=(R_D-R_H)I_1+R_SI_2 \quad (8)$$

With this asymmetric arrangement of input terminals relative to the output terminals, it is clear that the total transfer impedances in opposite directions will differ not only in sign but in absolute magnitude. Furthermore, when the Hall effect term exactly equals the direct transfer impedance term, the device will be unilaterally conducting.

In Fig. 3, the terminal location and dimensioning for unidirectional transmission are shown to scale. Taking the side of the square germanium slab as 100 units, the terminals 17' to 20' inclusive extend over 50 units, and the terminal edges are located 15 and 35 units distant from the corners of the square. The magnetic field for this arrangement was 17,000 gauss, and the ratio of the Hall coefficient C to the resistivity $\rho$ (in the absence of magnetic field) of the germanium was $3.58\times10^3$ where the Hall coefficient $$C=\frac{Vt}{IH}10^8(\text{cm.}^3/\text{coulomb}) \qquad (9)$$

where V is the generated Hall voltage in volts, I is the current in amperes flowing through the germanium, $t$ is the thickness of the sample in centimeters, H is the magnetic field in gauss, and the resistivity $\rho$ is measured in ohm-centimeters. The Hall angle $\theta$ may now be calculated from the following relationship:

$$\tan\theta=\left(\frac{C}{\rho}\right)(H)10^{-8} \qquad (10)$$

The Hall angle $\theta$, calculated from the foregoing, is approximately 31 degrees.

The terminals on the germanium Hall effect plate should be of a substantial extent (not point contacts) and be in intimate contact with the body of the Hall effect plate, in order to minimize losses. Although the terminals may be affixed to the germanium by any suitable method such as plating or soldering, good results were obtained by soldering leads to germanium surfaces on which gold had been evaporated, with 50–50 lead-tin solder.

Figure 4:
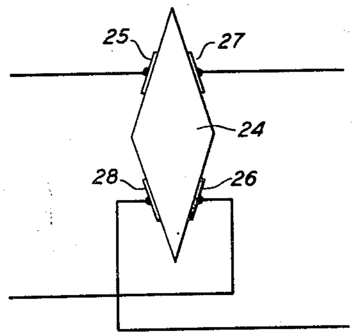
Figs. 4 and 5 show other arrangements in which the input terminals are located in conductively asymmetric positions relative to the output terminals.

In Fig. 4, a skew-shaped Hall effect plate 24 is used to obtain the required asymmetry between the first pair of opposed terminals 25, 26 and the second pair of opposed terminals 27, 28.

Figure 5:
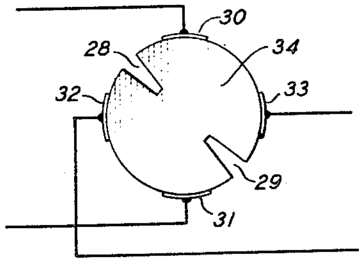

Fig. 5 illustrates still another form of Hall effect plate designed to give unidirectional transmission of electric signals. In this case the Hall plate 34 is generally circular, and is provided with four evenly spaced peripheral terminals 30 to 33. The required asymmetry between the first pair of opposed terminals 30, 31 and the second pair 32, 33 is provided by the opposed radial slots 28, 29 which are cut into the plate 34 from its outer edge between the contacts 30 and 32, and 31 and 33, respectively.

Figure 7:
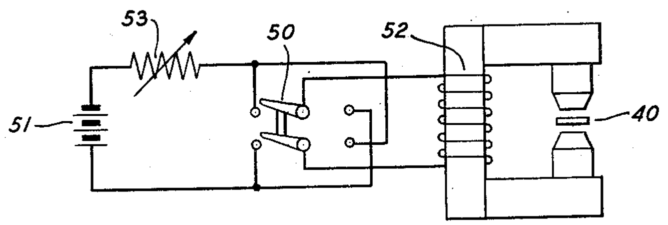
Fig. 7 shows an electromagnet which may be employed to apply a magnetic field to any of the Hall effect plates shown in Figs. 2 to 6.
Figure 6:
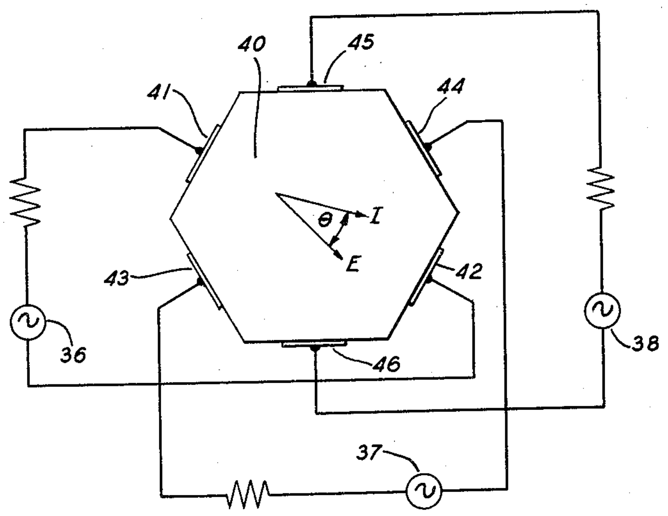
Fig. 6 illustrates a hexagonal Hall effect plate having three pairs of terminals.

The hexagonal Hall effect plate shown in Fig. 6 is not only another form of unilaterally conducting transducer, but also has other useful properties. In this embodiment, a terminal is located centrally on each of the six faces of the regular hexagonal, whereby signal inputs may be applied to any of three pairs of opposed terminals. With the proper value and polarization of magnetic field across the Hall effect plate 40, a signal applied by the source 36 to opposed terminals 41 and 42 produces an output voltage at opposed terminals 43 and 44, but an input signal applied at terminals 43 and 44 produces no output at terminals 41 and 42. Instead, an output appears at terminals 45 and 46. Another feature of this hexagonal Hall effect plate arrangement resides in the switching from one pair of output terminals to another upon reversal of the magnetic field. This reversal of the magnetic field may be effected through the use of the double pole-double throw switch 50 as shown in Fig. 7 which reverses the polarity of the current flow from the source 51 to the electro-magnet 52. This reversal of magnetic field changes the direction of the Hall angle $\theta$, and the signal applied to terminals 41 and 42 appears at terminals 45 and 46 instead of terminals 43 and 44. Considered from the 4-terminal network aspect, this reversal of magnetic field would also reverse the direction of unilateral transmission between any two pairs of terminals. The variable resistance 53 is used to adjust the magnetic field to the required critical value for unidirectional transmission.

Figure 8:
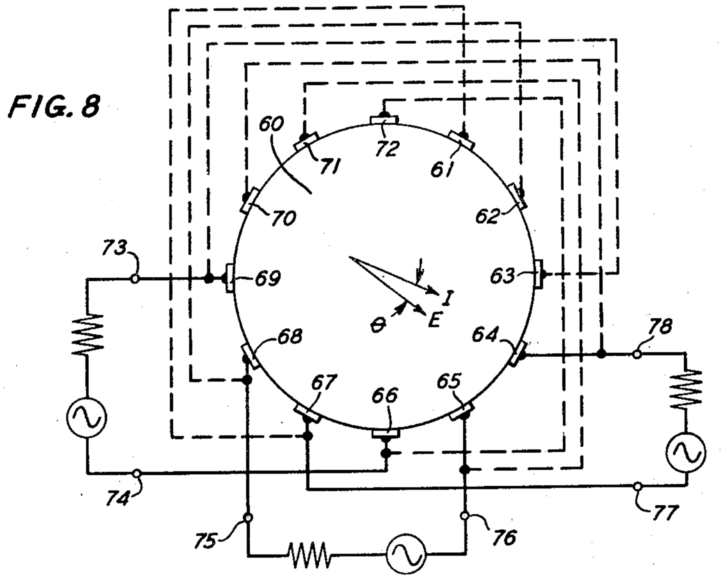
Fig. 8 shows a circular Hall effect plate for use with low values of Hall angle.

As shown in Fig. 8, additional terminals may be added and appropriately interconnected to achieve all the effects noted above. In particular, with the twelve terminals 61 to 72 located around the periphery of the Hall effect element 60, with diametrically opposite terminals directly connected together, and with pairs of terminals spaced 90 degrees apart connected to each of three external circuits 73—74, 75—76, and 77—78, results corresponding to those described above for the hexagonal Hall effect will obtain. For ease in studying the circuital arrangement, dashed lines have been used to represent the conductors interconnecting each pair of diametrically opposed terminals. Use of twelve or more terminals allows for effective operation at small Hall angles and thus permits the use of lower magnetic fields or materials having smaller Hall effect coefficients.

Figure 9:
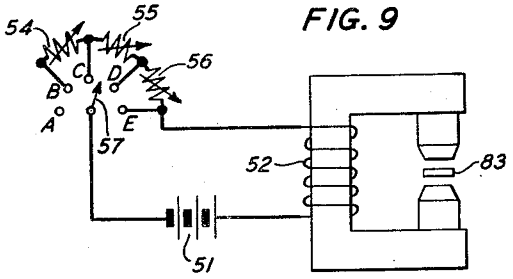
Fig. 9 illustrates an electromagnet and associated control circuit.
Figure 10:
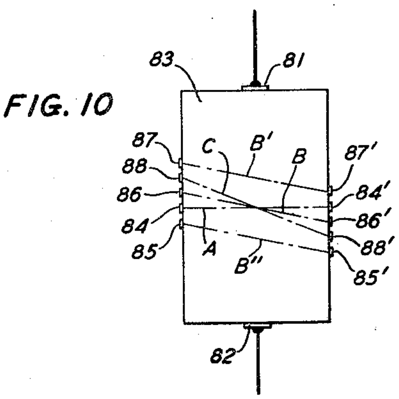
Fig. 10 represents the Hall effect plate which is to be polarized by the electromagnet of Fig. 9.

Figs. 9 and 10 show another switching arrangement which operates in response to variations in magnetic field and involves the use of three or more pairs of terminals spaced around a Hall effect plate. An electromagnet energizing circuit similar to that of Fig. 7 is shown in Fig. 9. In the circuit of Fig. 9, however, the variable resistors 54—56 may be preset to give particular values of magnetic field as the switch arm 57 is moved from contacts A to E, for purposes which will be detailed hereinafter. With respect to terminals 81 and 82 on the Hall effect plate 83 of Fig. 10, the equipotential line A is the perpendicular bisector of the line between the terminals, when no magnetic field is applied to the Hall plate. This corresponds to switch position A of Fig. 9, and no current will flow from terminal pair 81—82 to terminal pair 84—84' which is on line A, with no magnetic field. A family of equipotential curves B, B', and B'' are shown for a predetermined low value of magnetic field, corresponding to switch position B of Fig. 9. With this value of magnetic field, no current will flow from terminals 81 and 82 to terminal pairs 85—85', 86—86' or 87—87' and circuits connected to these terminal pairs would be effectively isolated from terminal pair 81—82. There would, however, be transmission between terminal pair 81 and 82 and terminals pairs 84—84' and 88—88' which are on equipotential lines for other values of magnetic field. Thus, by placing various pairs of terminals on equipotential lines for one value of applied magnetic field, and other pairs of terminals on other equipotential lines for other values of magnetic field, any desired terminal pair or group of terminal pairs which lie on equipotential lines for a particular value of magnetic field, may be effectively disconnected from the first terminal pair by a selection of the proper value of magnetic field.

These various embodiments described above have the unique property of unilateral transmission of electrical signals by a single simple passive element. In addition, the signals are transmitted with essentially no distortion and the device has a very broad frequency band, from 0 to approximately $10^{10}$ cycles per second. It is further noted that these integral non-reciprocal Hall effect plates are particularly well suited to be used in combination with negative resistance elements in the systems of the above-noted application of W. Shockley and W. P. Mason.

It is to be understood that the above-described arrangements are illustrative of the application of the principles of the invention. Numerous other arrangements such as the use of a Hall plate of varying resistivity, the use of other asymmetric plate and terminal geometries, or the use of composite terminals made up of several directly connected adjacent or non-adjacent terminals, for example, may be devised by those skilled in the art without departing from the spirit and scope of the invention.

What is claimed is:

1. In a directionally asymmetric current transmission element, a Hall effect plate having a first and second input terminal and a first and second output terminal, said first input terminal having a lower resistance path to said first output terminal than to said second output terminal, and said second input terminal having a lower resistance path to said second output terminal than to said first output terminal.

2. In a directionally asymmetric electrical signal transmission component, a Hall effect element having a first and second input terminal and a first and second output terminal, means applying a magnetic field to said Hall effect plate, said first input terminal having a lower resistance path to said first output terminal than to said second output terminal, said second input terminal having a lower resistance path to said second output terminal than to said first output terminal, and said element having a direct conduction transfer impedance substantially equal to the Hall effect transfer impedance.

3. The transmission component as set forth in claim 2 wherein means are provided for reversing the direction of the magnetic field.

4. In a directionally asymmetric current transmission system, a four-terminal Hall effect plate having two terminal pairs presenting a transfer impedance between said pairs when no magnetic field is applied to said plate substantially equal to the Hall effect transfer impedance between said pairs.

5. In a one-way transmission system, a Hall effect plate having two input terminals whereby a field of equipotential lines generally perpendicular to the line between said two terminals may be established when no magnetic field is applied to the plate, and two output terminals located at different ones of said equipotential lines on said plate.

6. In a directionally asymmetric current transmission element, two input conductors and two output conductors, a Hall effect plate, said input conductors having terminals contacting said Hall effect plate, and said output conductors having terminals contacting said Hall effect plate located such that a greater amount of said Hall effect plate separates one of said input terminals from one of said output terminals than from the other of said output terminals, and a greater amount of said Hall effect plate separates the other of said input terminals from said other output terminal than from said one output terminal.

7. In a one-way transmission system, a Hall effect plate, means applying a magnetic field to said plate, two pairs of terminals in contact with said plate, with the second pair of terminals being located in asymmetric relation with respect to the line joining the centers of said first pair.

8. A Hall effect unit as set forth in claim 7, and further including means for reversing the direction of the magnetic field.

9. In a one-way transmission system, a Hall effect plate having six equally spaced terminals located adjacent its periphery, said six terminals comprising three pairs of oppositely disposed terminals having circuit means connected therebetween, and means applying a magnetic field to said plate.

10. A unit as set forth in claim 9 in which an electrical signal is applied to two opposing terminals.

11. A unit as set forth in claim 10, further including means for reversing the direction of the magnetic field applied to said plate.

12. In a one-way transmission system, a rectangular Hall effect plate having terminals connected to it at its four thin edges with alternate peripheral terminals shifted in opposite directions from the centers of said edges.

13. In a one-way transmission system, a four-terminal Hall effect element having a first pair of terminals of extended area securely attached to the periphery of said element, and having a second pair of terminals also of extended area and securely attached to the periphery of said Hall element, with the first terminal of said first pair being separated by a greater peripheral distance from the first terminal of said second pair than from the second terminal of said second pair, and with the second terminal of said first pair being separated by a greater peripheral distance from said second terminal of said second pair than from said first terminal of said second pair.

14. In combination, a Hall effect medium, means applying a magnetic field to said medium, and six equally spaced terminals contacting said medium, two-wire circuits being connected to each pair of oppositely disposed ones of said terminals.

15. In combination, a Hall effect plate, a first pair of terminals in electrical contact with said plate, a second pair of contacts located on equipotential points of said plate with respect to said first pair of contacts for a first predetermined value of magnetic field, and a third pair of contacts located on equipotential points of said plate for a second predetermined value of magnetic field, and means for varying said magnetic field from one said predetermined value to the other.

16. An arrangement for intercoupling first, second and third transmission paths for transmission from the first to the second, from the second to the third, and from the third to the first, while substantially suppressing transmission in the reverse direction, comprising a passive, non-reciprocal coupler with first, second and third external coupling facilities, said coupler being characterized by an internal transmission path from the first external coupling facility to the second, from the second external coupling facility to the third, and from the third external coupling facility to the first, at least two of said internal transmission paths being non-reciprocal, and the first-mentioned first, second and third transmission paths being connected respectively to the first, second and third external coupling facilities.

17. A multicircuit device comprising a passive non-reciprocal coupler, a plurality of external coupling facilities for connecting transmission paths to said non-reciprocal coupler, said non-reciprocal coupler being characterized by a cyclic order of progression in which one external coupling facility is coupled to the next external coupling facility through the coupler in the said cyclic order, the couplings between external coupling facilities being substantially unidirectional.

18. In a one-way transmission system a Hall effect element having two input terminals contacting said element at the ends of a first line extending through the body of said element and having two output terminals contacting said element at the ends of a second line extending through the body of said element making an acute angle with said first line.

References Cited in the file of this patent

UNITED STATES PATENTS

| | | |
|---|---|---|
| 1,778,795 | Craig | Oct. 21, 1930 |
| 1,778,796 | Craig | Oct. 21, 1930 |
| 2,562,120 | Pearson | July 24, 1951 |
| 2,616,074 | McCreary | Oct. 28, 1952 |